(No Model.) 6 Sheets—Sheet 1.
R. F. CRAIG.
STARTER FOR VAPOR BURNERS.

No. 457,934. Patented Aug. 18, 1891.

(No Model.) 6 Sheets—Sheet 3.

R. F. CRAIG.
STARTER FOR VAPOR BURNERS.

No. 457,934. Patented Aug. 18, 1891.

(No Model.) 6 Sheets—Sheet 5.

R. F. CRAIG.
STARTER FOR VAPOR BURNERS.

No. 457,934. Patented Aug. 18, 1891.

Fig. 5.

Witnesses:
Henry F. Dieterich
B. W. Sommers

Inventor:
Robert F. Craig,
per
Henry Orth
Attorney.

UNITED STATES PATENT OFFICE.

ROBERT FULTON CRAIG, OF PAISLEY, SCOTLAND, ASSIGNOR TO ROUGHSEDGE WALLWORK AND ARTHUR COLLINGS WELLS, OF MANCHESTER, ENGLAND.

STARTER FOR VAPOR-BURNERS.

SPECIFICATION forming part of Letters Patent No. 457,934, dated August 18, 1891.

Application filed July 2, 1890. Serial No. 357,470. (No model.) Patented in England January 18, 1889, No. 1,013; in France January 14, 1890, No. 203,138, and in Belgium January 15, 1890, No. 89,188.

*To all whom it may concern:*

Be it known that I, ROBERT FULTON CRAIG, a subject of the Queen of Great Britain, residing at Paisley, in the county of Renfrew, North Britain, have invented certain new and useful Improvements in Starters for Vapor-Burners, (for which I have obtained Letters Patent for the United Kingdom of Great Britain and Ireland under date of January 18, 1889, No. 1,013; for France, dated January 14, 1890, No. 203,138, and for Belgium, dated January 15, 1890, No. 89,188;) and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

Referring to the drawings, Fig. 8 is a section of a starter devoid of an oil-reservoir.

The invention relates to the art of illumination or heating by means of self-generating gas or vapor burners for the use of more or less volatile or vaporizable combustible liquids—such as the hydrocarbons—and by means of spray-burners for the use of similar combustible liquids, which spray-burners are operated by means of steam that acts upon the combustible liquid to convert it into fine spray, so that it may be readily ignited and so that it will burn more freely than it would otherwise.

The invention relates more particularly to portable illuminating apparatus in which combustible liquids and self-generating gas-burners such as referred to are employed.

The burners of portable illuminating apparatus or lamps, so far as I know, require to be first started up—that is to say, in order to render such burners self-acting the generator-pipes or passages for the oil or steam have to be heated first—and this has heretofore been done by cotton waste or similar material saturated with oil, or with oil alone, the burner being provided with a cup or dish for the purpose. This mode of starting has certain disadvantages in that it takes some time to heat up the generator-pipes, especially in windy weather, when the burners are used for out-door illumination.

The object of my invention is to obviate these disadvantages and to provide a simple and effective means for preheating the burners, so as to render them self-acting.

To these ends the invention consists in the combination, with a vapor-burner, of a starting device and means for supplying air and oil to the said device and means for regulating the supply of air and oil.

The invention further consists in structural features and combinations of parts, as will be fully described, reference being had to the above-described drawings, in which like letters indicate like parts wherever such may occur in the various figures thereof.

In carrying out my invention the starter may form a fixture of the lamp or burner, or it may form a separate apparatus, in which case the starter is so constructed as to be readily applied to the burner, so that any desired number of burners may be started, one after another, with the same starter. Whether the starter is a fixture of the burner or lamp or whether it is a separate apparatus, means must be provided for supplying air and oil to the starter. The oil may be taken from the reservoir or conduit that supplies the burner and the air under pressure from any suitable reservoir, and the oil may also be supplied to the starter from a separate reservoir, and said reservoir may be combined with the starter.

I will first describe the starter in its combination with a portable illuminating apparatus or lamp where said starter forms an inseparable part or fixture. Inasmuch as the starter is to be supplied with air under pressure and with oil I have illustrated the same as applied to a lamp in which the oil is supplied to the burner by compressed air contained in the oil-reservoir itself as a convenient means for supplying such air and oil to the starter. This type of lamp is well known and is described and shown, for instance, in Letters Patent, dated February 25, 1890, No. 422,101, granted to W. R. Wallwork, and June 25, 1889, No. 405,860, granted to said Wallwork and A. C. Wells, a similar type of lamp being shown in conjunction with the starter when the latter constitues an independent portable lamp lighter or starter.

Figure 1:
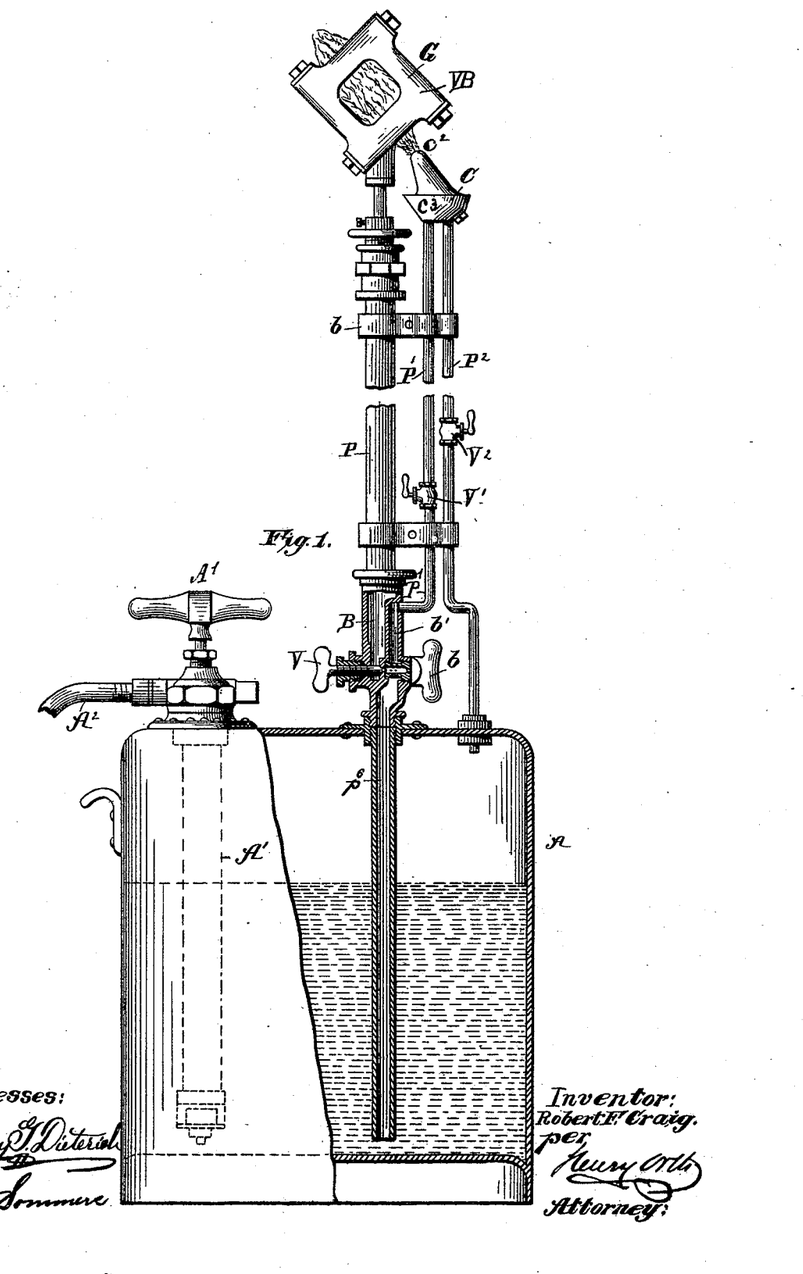
Figures 1, 2, 3, 4, and 5 are elevations of lamps, illustrating various ways of carrying out my invention, the oil-reservoir in Fig. 1 being partly broken away and partly shown in section.
Figure 2:
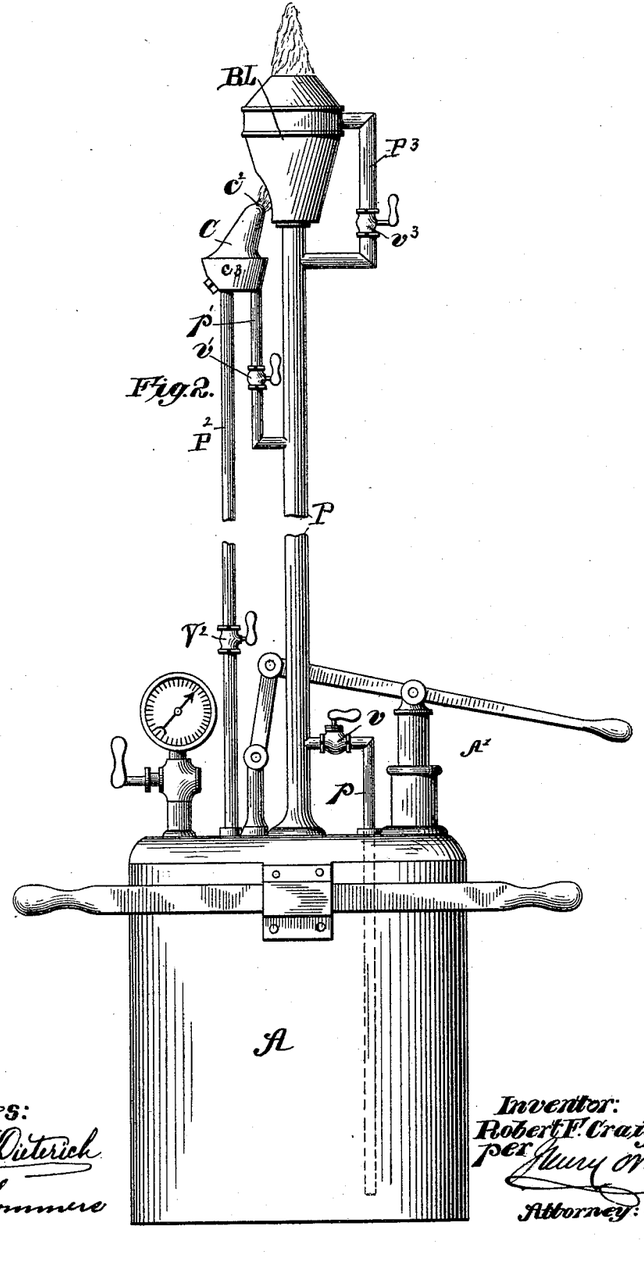
Figures 7, 8:
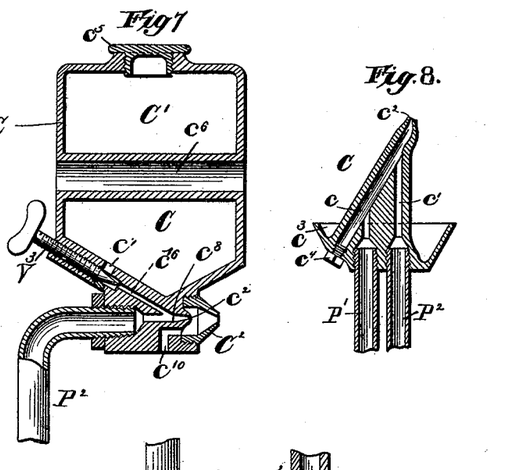

Referring more particularly to Figs. 1 and 2, A is the oil-reservoir, A′ the pump for forcing oil or air into said reservoir and compressing the air therein sufficiently to force the oil to the burner, and $A^2$ is the suction-pipe for the pump. The oil in the reservoir passes up the delivery-pipe $p^6$, that extends nearly to the bottom of the reservoir and communicates with a valve-casing B, in which is arranged a valve V and a filter $b$, substantially as shown and described in Letters Patent of the United States, granted to Wallwork and Wells December 24, 1889, No. 417,761, and which needs no special description, except as to changes made therein, which consist, essentially, in forming in said valve-casing a passage $b'$, that communicates with the chamber in which the filter $b$ is located for the purpose of supplying oil to the starter, a suitable pipe P′, provided with a valve or stop-cock V′, being connected with said passage $b'$. To the valve and filter casing B is connected the stand-pipe P, that carries a vapor-burner VB, substantially such as is shown in Letters Patent of the United States No. 404,064, granted to Wallwork and Wells May 28, 1889. The starter C is constructed substantially as shown in Fig. 8, it having the general form of a cone inclining to one side, and has two passages $c$ and $c'$, that merge together nearly at the apex of the cone which constitutes the jet or burner nozzle $c^2$. The oil may be supplied to the nozzle through either passage $c$ or $c'$, this depending upon the relative arrangement of the starter and burner. In Fig. 1 I have shown the starter arranged with the oil-supply pipe P′ connected with passage $c'$, while in Figs. 2 and 8 said pipe is connected with passage $c$, which is a through-passage closed at the inner end by a screw-plug $c^4$. The object of making the passage $c$ a through-passage is to afford access thereto when used as an oil-passage for the purpose of removing carbon that may form on the walls thereof. Around the base of the starter C is formed a drip-cup $c^3$ for obvious purposes. In order to promote the combustion of the oil supplied to the starter and to obtain as great a heating-power as possible, I supply air under pressure, taken from the upper or air space of the reservoir A through a pipe $P^2$, having a suitable valve or stop-cock $V^2$.

In Fig. 2 I have shown a slight modification in the arrangement of the conduits for supplying oil and air to the starter. The stand-pipe P in this construction is closed at both ends, the oil being supplied thereto through a branch pipe $p$, provided with a suitable valve or stop-cock $v$. The oil is supplied to the starter C through a pipe $p'$, connected with stand-pipe P and having a valve or stop-cock $v'$, the air being supplied to the starter through pipe $P^2$, connected, as above described, with the upper part or air-space of the reservoir A.

The lamp BL (shown in Fig. 2) is what is known as the "beacon-lamp," the oil being supplied thereto through pipe $P^3$, provided with a valve or stop-cock $v^3$, and connected with stand-pipe P, and, as shown, the starter-nozzle $c^2$ is arranged opposite an opening in the casing that incloses the burner of said lamp.

To start a lamp such as shown in Fig. 1, the valves of all the pipes being of course closed, the valves V′ $V^2$ of the oil and air pipes P′ $P^2$, respectively, are opened. Oil will be fed through passage $c'$ of the starter C, meeting the air coming through passage $c$, by which such oil will be sprayed and issue from nozzle $c^2$ in a finely-divided condition and is ignited. The heat of the flame is a comparatively intense one, so that the valve V may be opened after igniting the starter-jet to supply oil to the generator G of the vapor-burner VB, vapor being generated in a very short time to supply the vapor-burner and render it self-acting when the valves V′ and $V^2$ of the oil and air pipes P′ and $P^2$ are closed. When the supply-pipes are arranged as shown in Fig. 2, the valves $v$ and $v'$ of the oil branch pipes $p$ and $p'$ and the valve $V^2$ of the air-pipe $P^2$ are first opened, and after igniting the starter-jet the valve $v^3$ in branch pipe $P^3$ is opened to supply the generator of the beacon-lamp BL, and when the burner of the latter is started the valves $v'$ $V^2$ are again closed. In either construction the starter-flame will ignite the burner-flame as soon as vapor from the generator is supplied to said burner.

Figure 3:
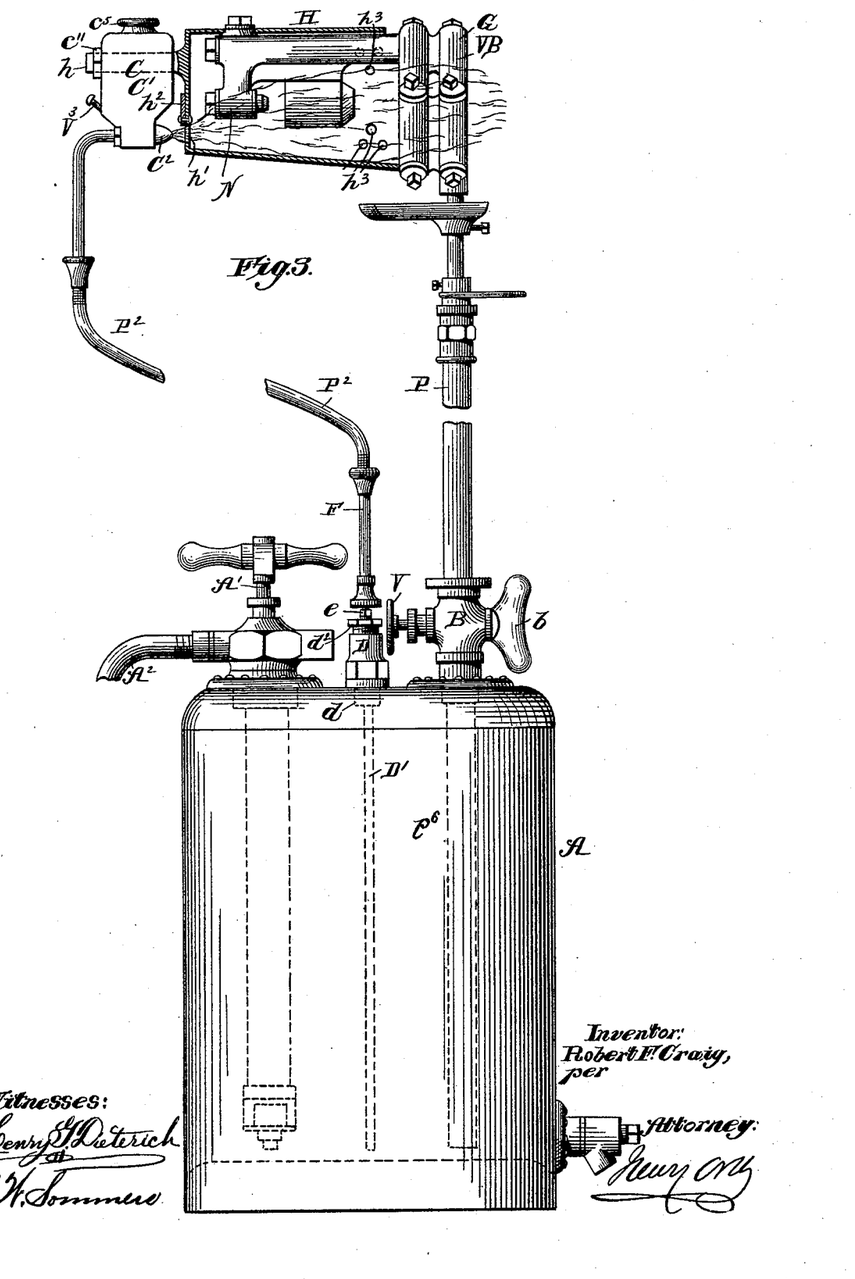
Figures 10, 11:
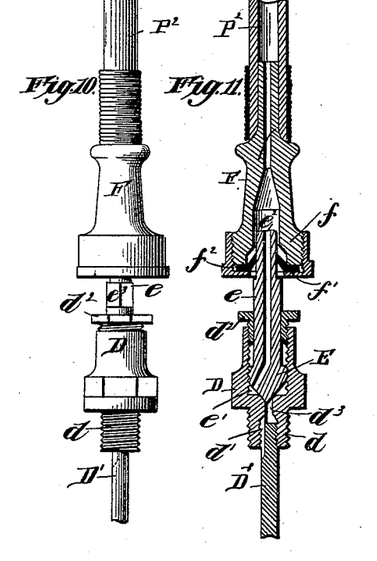
Fig. 10 is an elevation and Fig. 11 is a section of a coupling for connecting the air-supply pipe for the starter with the air-space of the oil-reservoir.

I will now describe the starter as a separate device, adapted for use in successively starting any desired number of lamps, and in this case the arrangement for supplying oil and air to the starter-burner may be variously modified, and so may also the starter-burner itself. The air for the starter may be taken from a separate reservoir, while the oil is supplied to the starter from a reservoir that is combined therewith or forms a part thereof. In Fig. 3 I have shown an arrangement for taking the air for the starter from the lamp-reservoir A, the air-pipe $P^2$ being a flexible one and adapted to be detached from the lamp-reservoir. In some of the Wallwork and Wells lamps is used a rod, by means of which the quantity of oil in the reservoir may be ascertained, said rod being connected to a screw-plug screwed in the top of the reservoir; and in order to avoid making a separate air connection for the starter-pipe P², I avail myself of this plug by suitably modifying its construction, as will now be described, reference being had to said Fig. 3 and to Figs. 10 and 11. In these figures, D' is the rod referred to and D the plug that has an exteriorly screw-threaded extension $d$, into which the rod D' is screwed, the upper end of the said rod being grooved or cut away to form an air-passage $d'$. In the enlarged portion of the bore of the plug D is screwed a valve E, so as to be movable vertically in the said enlarged portion when rotated, the escape of air around the valve-stem $e$ being prevented by means of a suitable stuffing-box gland $d^2$. The valve E is a cone-valve, adapted to seat in the contracted portion $d^3$ of the bore of the plug D and to admit of the flow of air from passage $d^3$ through the stem $e$ of the valve E and to cut off the flow of air therethrough. The bore of the valve-stem extends laterally through the cone-valve E and opens at the side thereof, as shown at $e'$, Fig. 11, the valve being operated by the application of a key to the squared portion $e^3$. The flexible air-pipe P² is attached to a coupling F, to the enlarged end $f$ of which is secured a cup-leather $f'$ by means of a screw-cap $f^2$, so as to form an air-tight joint when the coupling is stuck on the attenuated portion $e^2$ of the valve-stem $e$, as shown in said Fig. 11. It will be seen that the air-pipe can be readily connected with and detached from the plug D and that air may be as readily supplied to said pipe or the supply thereto cut off, as above explained and as circumstances may require. The oil is supplied to the starter C from a reservoir forming an integral part thereof, and said starter is constructed so as to be readily attached to or detached from the vapor-burner VB, and the latter construction will necessarily vary according to the construction or style of burners to which said starter may be applied.

In Fig. 3 I have shown a starter as adapted for use with one of the Wallwork and Wells vapor-burners VB, in which is used a removable shield or cover for the burner proper, said shield or cover H having a handle $h$ projecting from its closed rear end for the purpose of manipulating said shield. In order to readily attach the starter C to the vapor-burner VB, I avail myself of the handle $h$, an opening $h'$ being formed in the end wall of the shield H for the passage of the starter-jet. The starter C in this construction consists of an oil-reservoir C', that has a feed-opening closed by a screw-plug $c^5$, and a tubular bearing $c^6$, extending about midway through the same for the reception of the handle $h$ on shield H, so that the starter C may be readily slipped on or taken off said handle $h$. The bottom of the starter is conical and provided therein with the inclined feed-passage $c^{16}$, the outer portion of which is enlarged and screw-threaded interiorly for the reception of the screw-threaded cone or needle-regulating valve V³, the valve end of which is adapted to close the contracted portion of the feed-passage, the oil from reservoir C' having access to the enlarged portion of said passage through a port $c^7$. The passage $c^{16}$ merges into a substantially horizontal passage $c^8$, formed in a boss cast with the bottom of the reservoir C', which passage $c^8$ terminates in a jet-nozzle $c^2$, projecting into an interiorly screw-threaded tubular recess or branch of the boss, into which is screwed a combining-cone C², to which air is admitted through a passage $c^{10}$, that is open to the atmosphere. In the rear enlarged portion of the passage $c^8$ is secured one end of the flexible air-pipe P², that supplies the necessary air for the spraying of the oil supplied from the reservoir C'. The object of providing a combining-cone C² for the jet-nozzle $c^2$ of the starter is to supply an additional quantity of air to the jet to promote combustion and increase the heating-power of the starter, as will be readily understood.

Figure 4:
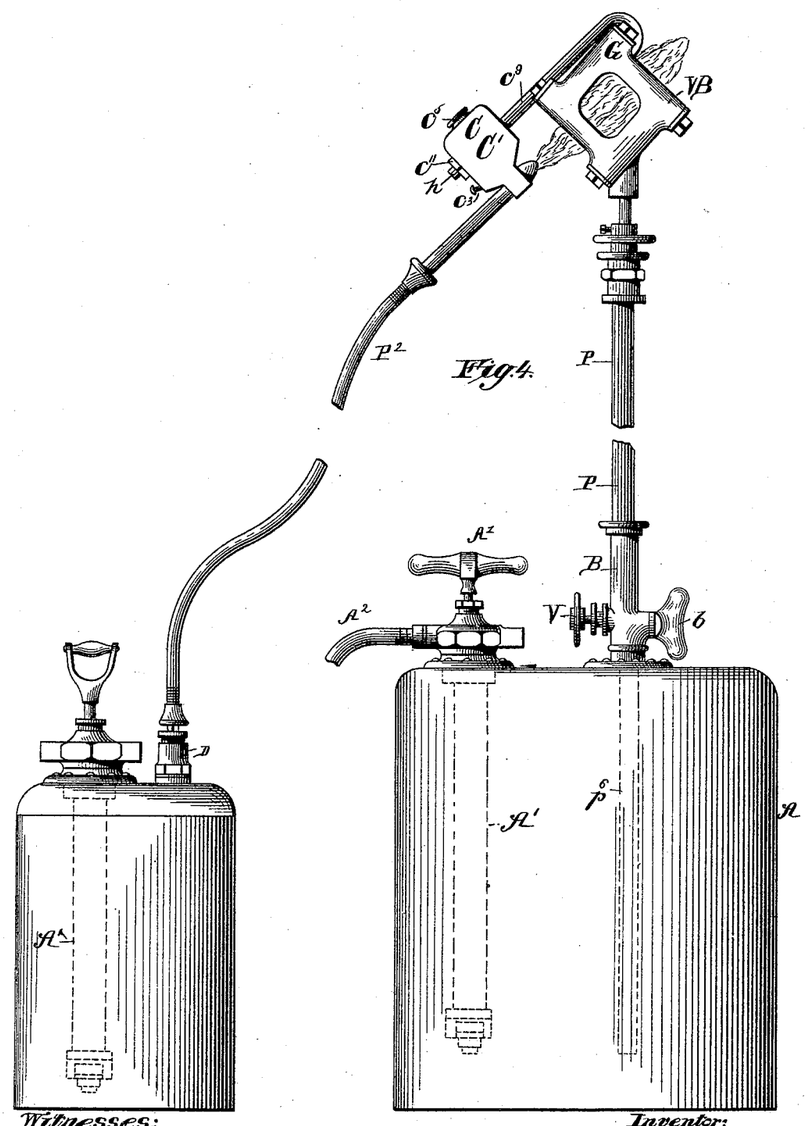

The operation of this starter is as follows: The starter C is slipped onto the handle $h$ of the burner-shield H, when the combining-cone will be opposite the opening $h'$ in the rear wall of shield H, which opening may be closed by a gate $h^2$ after the vapor-burner VB has been started and the starter removed. The coupling F of the air-pipe P² is then stuck on the shank $e^2$ of the valve E, and the latter is unscrewed to raise off its seat. This may be done by a key or wrench, the stem of the valve-plug being squared for the purpose, as shown at $e^3$, Fig. 10, as stated above. The regulating-valve V³ of the starter is now adjusted to supply oil to the passage $c^8$, which will be sprayed by the air coming from the lamp-reservoir A through the pipe P². The jet issuing from nozzle $c^2$ of the starter and passing through the combining-cone C² will produce a partial vacuum in said cone, thereby drawing air into the cone through passage $c^{10}$, adding an increment of air to the sprayed jet for the purpose hereinabove set forth. A comparatively-intense flame is thus obtained that will rapidly heat the generator G of the vapor-burner VB, additional air being supplied to the flame through the openings $h^3$ in the shield H, so that the valve V in the stand-pipe P may be adjusted in a short time to supply oil to the vapor-burner. After the vapor-burner has been started the valves E and V³ are closed, the air-pipe P² is detached from the valve-plug $e$, and the starter removed from the handle $h$ of shield H. The starter may now be carried to another lamp for starting the same. If desired, the air may be supplied from a source other than the lamp-reservoir, in which case I provide a small air-reservoir R, Fig. 4, and combine therewith a pump A', as is the case with the lamp-reservoir A, and I preferably employ a luting for the forcing end of the pump-barrel, for which purpose any liquid, as water, for instance, may be used for obvious purposes. I prefer, however, to use oil as a luting, and more especially one of the lighter hydrocarbons, for the reason that the air forced into the reservoir will be more or less carbureted, thus materially assisting in the starting of the starter and adding to the heating-power of the starter-jet. The starter C in this case is constructed substantially like the starter shown in Fig. 3, and in said Fig. 4 I have shown the starter applied to the generator G of a Wallwork and Wells vapor-burner of parallelogrammatic form, as in Fig. 1, which may or may not be devoid of a shield, a hook-arm $c^9$ being provided for hooking the starter to the generator G. The arm $c^9$ may form an integral portion of the starter-reservoir C' or not, as desired, and when the arm $c^9$ does not form an integral part of the reservoir a key or a nut $c^{11}$ may be employed to secure the starter to the arm, as shown in Fig. 4.

Figure 5:
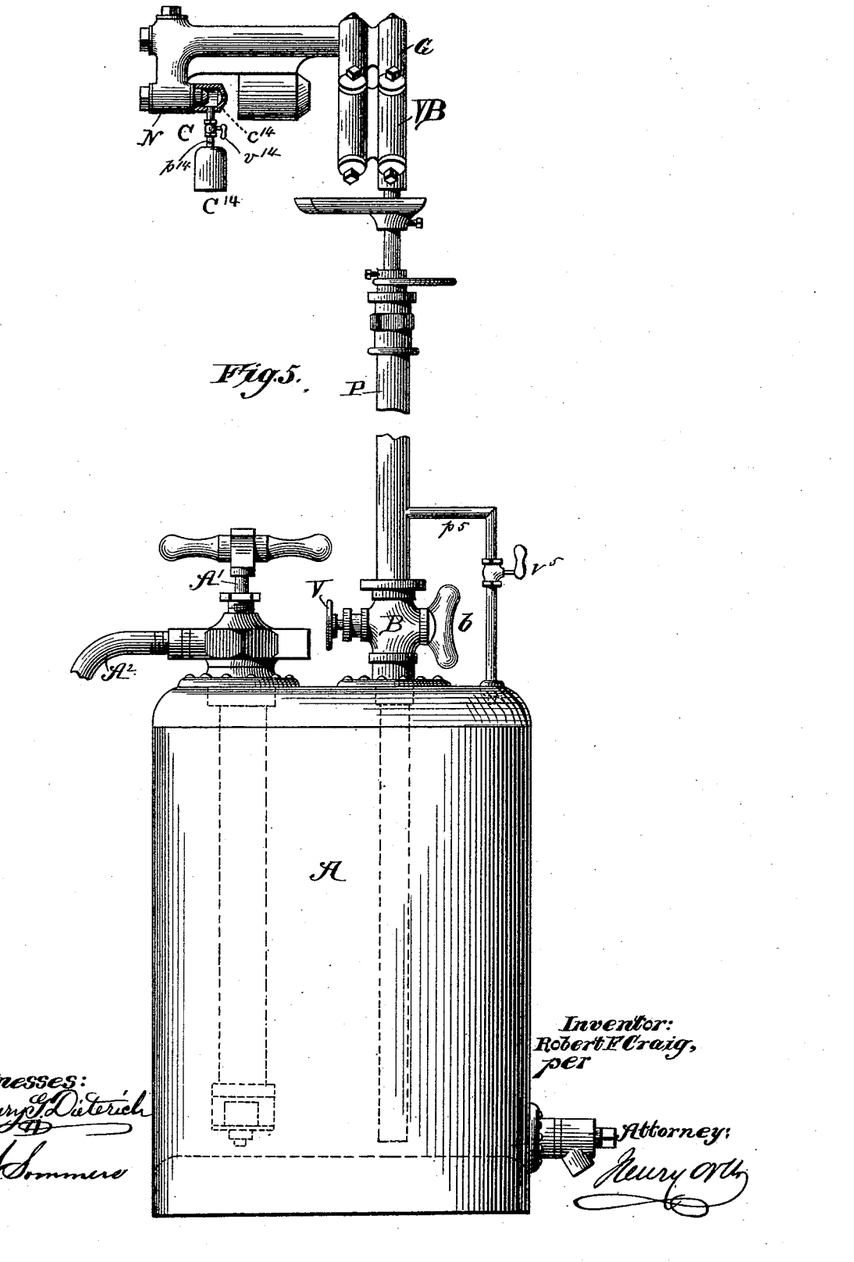
Figure 6:
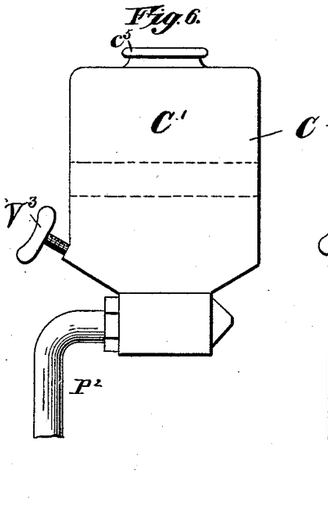
Fig. 6 is an elevation, and Fig. 7 a vertical section, of a starter having an oil-reservoir combined with it.

In lamps which have a vertical burner, or, for that matter, a horizontal burner without a combining-cone or with a removable combining-cone, the air for the starter may be supplied through the stand-pipe P of the lamp and the generator to the jet-nozzle N of the vapor-burner VB. The starter C in this case consists of a jet-nozzle $c^{14}$, connected by a short pipe $p^{14}$ (having a valve or stop-cock $v^{14}$) with a small oil-reservoir $C^{14}$, the starter-nozzle being so constructed as to be stuck on the jet-nozzle N of the vapor-burner VB, as shown in Fig. 5, the stand-pipe P being connected by a pipe $p^5$, provided with a valve or stop-cock $v^5$, with the air-space of the reservoir A. It is obvious that if the oil-passage is closed by the regulating-valve V and the valve $v^5$ in the air branch $p^5$ is opened air will be supplied to the jet-nozzle N of the vapor-burner, and if the nozzle $c^{14}$ of the starter is secured to said nozzle N the jet of air will produce a partial vacuum in said starter-nozzle, so that on opening valve $v^{14}$ oil will be drawn from the starter-reservoir $C^{14}$ and sprayed by the jet of air.

Figure 9:
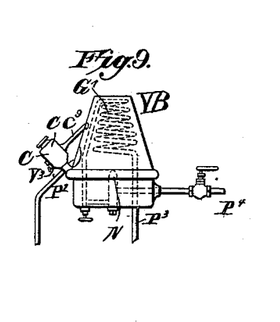
Fig. 9 is an elevation illustrating my invention applied to a steam-spray burner.

In Fig. 9 I have shown the starter applied to a steam-spray lamp, in which G' is the generator or superheater coil connected with the jet-nozzle N of the vapor-burner VB and $P^3$ is the water or steam supply pipe and $P^4$ the oil-supply pipe, the last-named pipe being also connected with the jet-nozzle N, as usual. The starter C is hooked to the burner casing or shield, the jet impinging upon the generator or superheater G' through an opening in the said casing.

Having described my invention, what I claim is—

1. A vapor-burner having oil and air ducts, and means, substantially as described, for supplying oil and compressed air to the corresponding ducts of said burner, and means for temporarily attaching the burner to a lamp vapor-burner, so as to project its flame onto said lamp vapor-burner, said parts constituting a portable lighting or starting device for the purpose of lighting lamps provided with vapor-burners.

2. The combination, with a lamp comprising a compressed-air and oil reservoir, a vapor-burner, and a valve-duct connecting the burner with the oil in the reservoir, of a starter comprising a jet-nozzle, an oil-reservoir, a valved duct connecting the oil-reservoir with the nozzle, and a valved duct connected with the air-space of the lamp-reservoir and with the jet-nozzle of the starter for supplying air to the said nozzle, as set forth.

3. The combination, with a lamp comprising a compressed-air and oil reservoir, a vapor-burner and a valve-duct connecting the burner with the oil in the reservoir, and a valved air-delivery pipe in communication with the air-space of said reservoir, of a starter comprising a jet-nozzle, an oil-reservoir, a valved duct connecting the reservoir with the nozzle, an air-duct in communication with the said nozzle, a flexible air-pipe connected with said duct, and a coupling for coupling the flexible pipe with the air-delivery pipe of the lamp-reservoir, substantially as and for the purposes specified.

4. A starter for vapor-burners, consisting of an oil-reservoir provided with a tubular bearing extending through the same, a jet-nozzle, and a valved duct leading from the reservoir to the nozzle, and an air-duct leading to the jet-nozzle, said parts forming an integral whole, as set forth.

5. The combination, with a lamp comprising a compressed-air and oil reservoir, a vapor-burner, a valved duct connecting the burner with the reservoir, the plug D, and cone-valve E, seated in said plug, said valve having a tubular valve-stem $e$, projecting from the plug, of a starter comprising an oil-reservoir, a jet-nozzle, a valved duct in communication with the reservoir and nozzle, an air-duct also in communication with said nozzle, a flexible pipe connected with the air-duct, and a coupling F, to which said pipe is attached, said coupling being adapted to be applied to the valve-stem $e$ of valve E, substantially as and for the purposes specified.

6. The herein-described starter for vapor-burners, comprising a reservoir C', having a tubular bearing $c^6$, extending therethrough, and having a conical bottom in which is formed a boss or projection, a horizontal passage $c^8$, terminating in a jet-nozzle $c^2$, formed in said boss, and a valved oil-duct in the conical bottom of the reservoir, said duct being in communication with duct $c^8$ and with the oil-reservoir, as and for the purposes specified.

7. The herein-described starter for vapor-burners, comprising an oil-reservoir C', having a tubular bearing $c^6$, extending therethrough, and having an inclined bottom and a cylindrical boss formed on said bottom a horizontal passage formed in said boss and terminating in a jet-nozzle, and a valved duct formed in the inclined bottom in communication with the horizontal passage and with the oil-reservoir, in combination with a combining-cone secured to the boss in front of the jet-nozzle, and a duct $c^{10}$ in communication with the cone and with the atmosphere, substantially as and for the purposes specified.

In testimony whereof I affix my signature in presence of two witnesses.

ROBERT FULTON CRAIG.

Witnesses:
   ALEX. HART,
      *Law Clerk, Paisley.*
   JAS. HAMILTON,
      *Law Apprentice, Paisley.*